2 Sheets--Sheet 1.

SAMUEL LEE.

Improvement in Combined Gridiron, Griddle, and Frying Utensil.

No. 4,619. Reissued Oct. 31, 1871.

*Witnesses*

C. B. Nottingham

F. C. Smith

*Inventor.*

Samuel Lee by A Pollok

Atty

SAMUEL LEE.

Improvement in Combined Gridiron, Griddle, and Frying Utensil.

No. 4,619. Reissued Oct. 31, 1871.

*Witnesses*

C. B. Nottingham

T. C. Smith

*Inventor.*

Samuel Lee by A. Pollok his atty.

UNITED STATES PATENT OFFICE.

SAMUEL LEE, OF TAUNTON, MASSACHUSETTS.

IMPROVEMENT IN COMBINED GRIDIRON, GRIDDLE, AND FRYING UTENSIL.

Specification forming part of Letters Patent No. 118,462, dated August 29, 1871; reissue No. 4,619, dated October 31, 1871.

*To all whom it may concern:*

Be it known that I, SAMUEL LEE, of Taunton, in the county of Bristol and State of Massachusetts, have invented certain Improvements in Culinary Utensils for use on stoves, ranges, &c.; and I hereby declare the following to be a full, clear, and exact description thereof, due reference being had to the accompanying drawing making part of this specification, in which—

Figure 1:
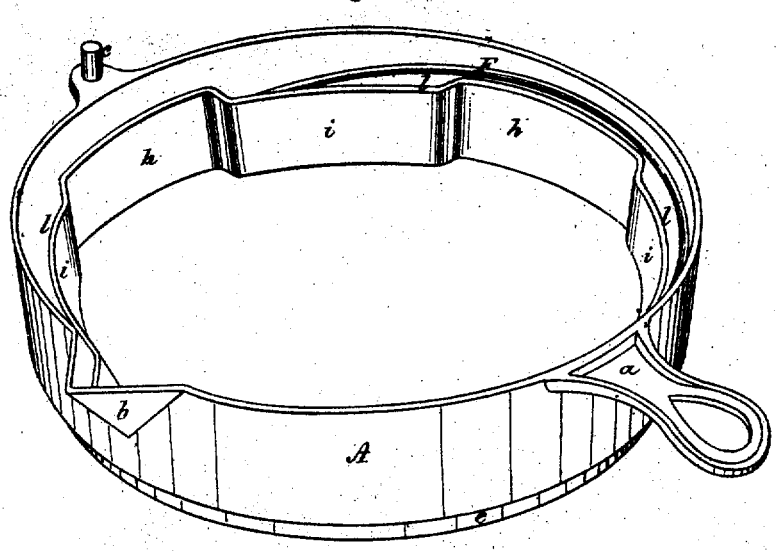
Figure 2:
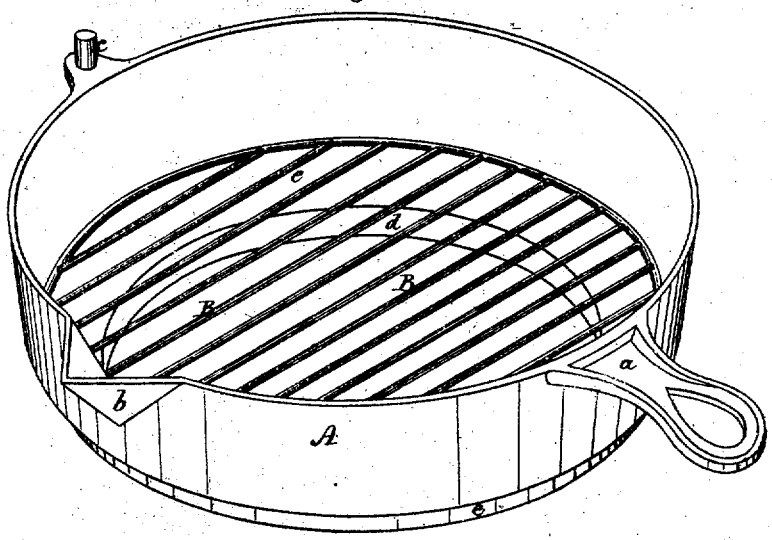
Figure 3:
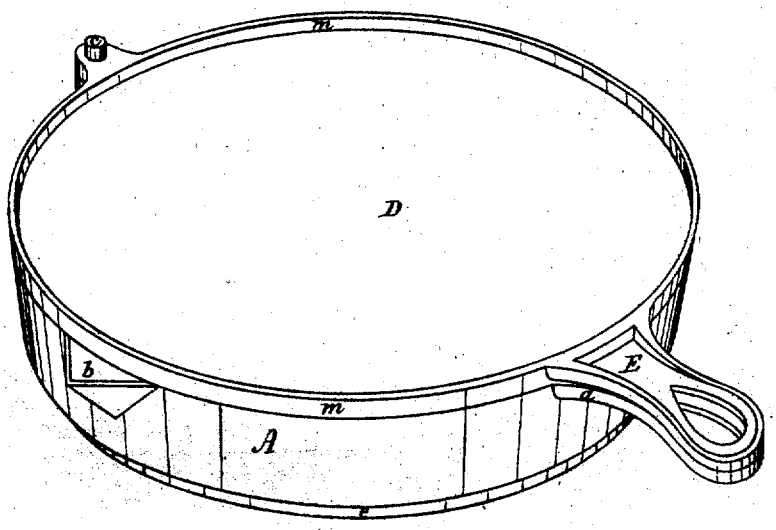
Figure 4:
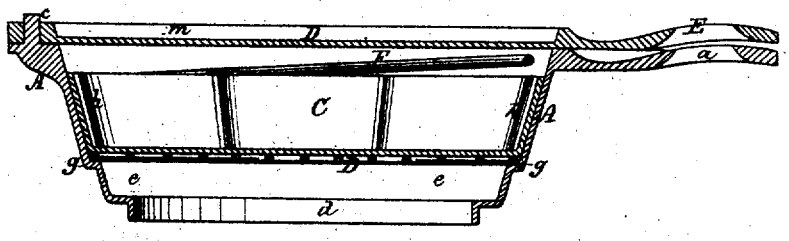

Figure 1 is a perspective view of a fry-pan applied to a frame. Fig. 2 is a perspective view of a broiler applied to a frame. Fig. 3 is a perspective view of a griddle applied thereto. Fig. 4 is a longitudinal vertical section through the center of the several utensils when in place.

This invention may be considered a combination cooking utensil, inasmuch as it embodies several distinct utensils so combined as to occupy but little more space than one alone would require. This invention consists in the employment of an annular frame or band, flaring from its lower opening upward, and provided with an integral shelf or ledge for supporting either a broiler or frying-pan, or both a broiler and a frying-pan at one and the same time, the said frame having a suitable handle or bale by which it may be moved about, and being provided with a flat cover having an outstanding lip, and being so made as to constitute a griddle, the whole being so arranged that the several operations of broiling, frying, and baking may be performed in a convenient manner, and articles, after being cooked in the pan or on the broiler, may be kept hot upon the griddle until required for use; the fry-pan being so constructed that when it is placed within the frame one or more spaces are formed between them to allow the gases, smoke, and odor of the food being cooked to be carried through the stove or range up the flue instead of escaping into the kitchen and through the house; the several utensils when not required for use being compactly put together so they will only occupy the space ordinarily occupied by each respective utensil.

To enable others skilled in the art to understand and use my invention, I will proceed to describe the manner in which I have carried it out.

In the said drawing, A is a cast-iron frame of nearly circular form, provided with a handle, *a*, spout *b*, and stud or projections *c*, cast in one and the same piece therewith. The outside of the frame is provided with an annular lip or rim, *d*, which fits into one of the ordinary circular pot-holes of the stove or range to keep it in place thereon. The diameter of the interior of the bottom of the frame is enlarged at *e* in order that a greater area may be afforded for the reception of the article to be cooked, which, when required to be broiled, is placed on a grate, B, or series of bars, which is supported by its periphery resting on a circular rim or flange, *g*, formed within the interior of the frame, a short distance above the point *e*, where it is enlarged. A circular plate, D, with a handle, E, and a rim, *m*, on its upper side, extending round its outer edge, serving as a griddle, and also a cover, is now fitted over the stud or projection *c*, the whole of the top of the frame being covered except its spout *b*, in order that the fumes of the article being cooked may not escape into the room and through the house, the aperture formed by the open spout affording a passage for the air to draw down into the stove and carry the gases, smoke, and disagreeable odors up the flue of the chimney. When the article of food is to be fried a frying-pan, C, is placed so that portions *h* of its perimeter may rest either upon the rim or flange *g*, or upon the grate if it be not removed, and the article is placed within the pan and the griddle swung into place, so as to cover the frame except its spout. This pan is so constructed that alternate portions *i* of its side or rim are of less diameter than the portions *h*, forming a series of alternate spaces, *l*, between the interior of the frame and the outside of the pan, through which the fumes are carried up the stove and into the chimney, as before described. When griddle, buckwheat, or other similar cakes are to be baked, the fry-pan is removed and also the broiler, if desired, after which the griddle or plate is swung over into place, ready to receive the batter. The griddle, besides being used as a cover and to bake cakes upon, may also be employed for receiving and keeping hot the food taken from the broiler and fry-pan, the rim *m* preventing the escape of the juices, melted fat, &c. F is the bail of the fry-pan, by which it may be transported to or from its place in the frame; but the fry-pan may be provided with a handle instead of a bail, and the permanent handles of both the fry-pan and griddle may be dispensed with, and they be removed from place to place by means of a lifter fitting into a socket formed thereon.

In conclusion, I would state that I am aware it is not new to use a griddle as a cover for a gridiron. This feature is shown in Clayton Denn's patent of June 23, 1868. But in Denn's utensil the gridiron is cast in one piece with and forms a permanent bottom for the frame on which the cover rests, and must always intervene between the fire and the cover or any cooking utensil placed within the frame; and the cover, moreover, in order to be used as a griddle, must be turned over, or bottom upward, and removed from the frame, the griddle portion being turned downward while this device is used as a cover proper. In the culinary vessel invented by me, however, the gridiron is detachable and forms no part of the frame; the frame itself is without a bottom; and the griddle, while forming the cover of the vessel, is adapted, without any change in its position, to be used for cooking purposes. I am also aware that a hinged griddle has been combined with a "spider" so as to cover the same; but in any such case heretofore the hinge has been horizontal, thus necessitating the tilting or turning up of the griddle in order to obtain access to the spider. In my utensil, on the contrary, the griddle has a vertical hinge, upon which it may be swung back and forth without thereby causing it to move in other than a horizontal plane, the advantage of which is apparent; and I prefer to make this hinge to consist, as herein shown, of a vertical pin and socket-joint, so that the griddle may, at pleasure, be either swung aside or lifted bodily from the vessel.

What I claim, therefore, and desire to secure by Letters Patent, is—

1. A cooking utensil, composed of a bottomless metallic frame, adapted to fit in or over the pot-hole of a stove, and provided internally with means to uphold a gridiron or other article, as described, placed within, but having no permanent connection with it, in combination with a cover the upper face of which forms a griddle, substantially as herein shown and set forth.

2. The combination with the metallic frame, adapted to carry within it a gridiron or other article, as described, of a cover, connected therewith by a vertical hinge, and formed on its top to serve as a griddle, substantially as herein shown and set forth.

3. In a cooking utensil, substantially such as herein described, the connection of the combined griddle and cover with the frame by means of a vertical pin and socket joint, substantially as and for the purposes set forth.

4. A cooking utensil composed of the bottomless metallic frame, the gridiron, the fry-pan, and the combined cover and griddle, constructed and arranged to operate substantially as shown and described.

SAMUEL LEE.

Witnesses:
FRED. CURTIS,
WILLIAM KEEFE.

(154)